United States Patent [19]

Nakamura et al.

[11] Patent Number: 4,876,571
[45] Date of Patent: Oct. 24, 1989

[54] COPYING MACHINE HAVING A BAR CODE READER

[75] Inventors: Yoko Nakamura, Kawasaki; Fumiyo Kojima, Mitaka; Hirobumi Yoshino, Tokyo, all of Japan

[73] Assignee: Ricoh Company, Ltd., Tokyo, Japan

[21] Appl. No.: 180,068

[22] Filed: Apr. 11, 1988

[30] Foreign Application Priority Data

| Apr. 11, 1987 | [JP] | Japan | 62-87906 |
| Apr. 11, 1987 | [JP] | Japan | 62-87907 |
| Apr. 11, 1987 | [JP] | Japan | 62-87910 |
| Apr. 13, 1987 | [JP] | Japan | 62-88777 |
| Apr. 13, 1987 | [JP] | Japan | 62-88778 |
| Apr. 13, 1987 | [JP] | Japan | 62-88779 |

[51] Int. Cl.$^4$ .......................................... G03G 15/00
[52] U.S. Cl. .................................... 355/210; 355/326
[58] Field of Search ............... 355/14 C, 14 R, 6, 3 R, 355/133, 4, 14 D; 235/462-467

[56] References Cited

U.S. PATENT DOCUMENTS 4,716,438 12/1987 Farrell ..................................... 355/6
4,757,348 7/1988 Rourke et al. ......................... 355/6

Primary Examiner—R. L. Moses
Attorney, Agent, or Firm—Oblon, Spivak, McClelland, Maier & Neustadt

[57] ABSTRACT

A copying machine including a sheet in which bar codes corresponding to various copying modes are printed, a bar code reader for reading the bar codes from the sheet, a decoding section for decoding signals transmitted from the bar code reader and a control section for setting a copying mode based on data derived from the decoding section.

6 Claims, 27 Drawing Sheets

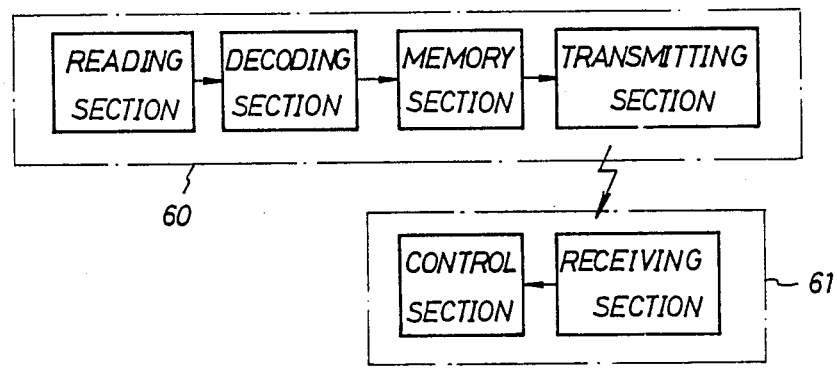

Fig.9

| MODE SECTION (2-DIGIT) | STOP |
|---|---|
| START | |

Fig.10

| MODE SECTION (2-DIGIT) | DATA SECTION (1-DIGIT) | STOP |
|---|---|---|
| START | | |

Fig.11

| MODE SECTION | MODE | KEY | CLEAR STOP | PRINT KEY | DENSITY | UPPER TRAY | LOWER TRAY | x1.0 | x0.71 | x1.41 | |
|---|---|---|---|---|---|---|---|---|---|---|---|
| | CODE | 00 | 01 | 02 | 03 | 04 | 05 | 06 | 08 | 09 | |
| DATA SECTION | | 0~9 | — | — | MANUAL 0~6 AE:7 | — | — | — | — | — | |

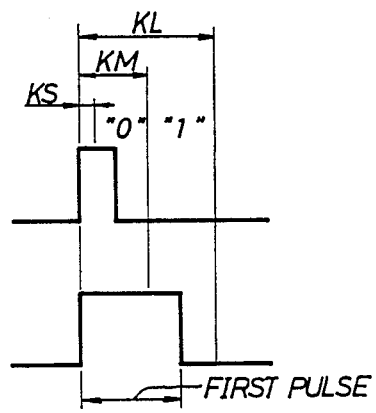

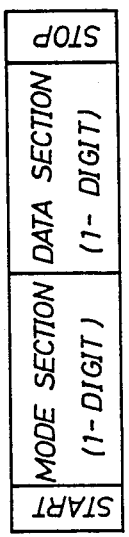
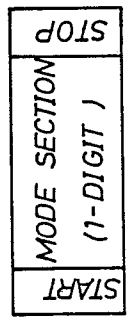
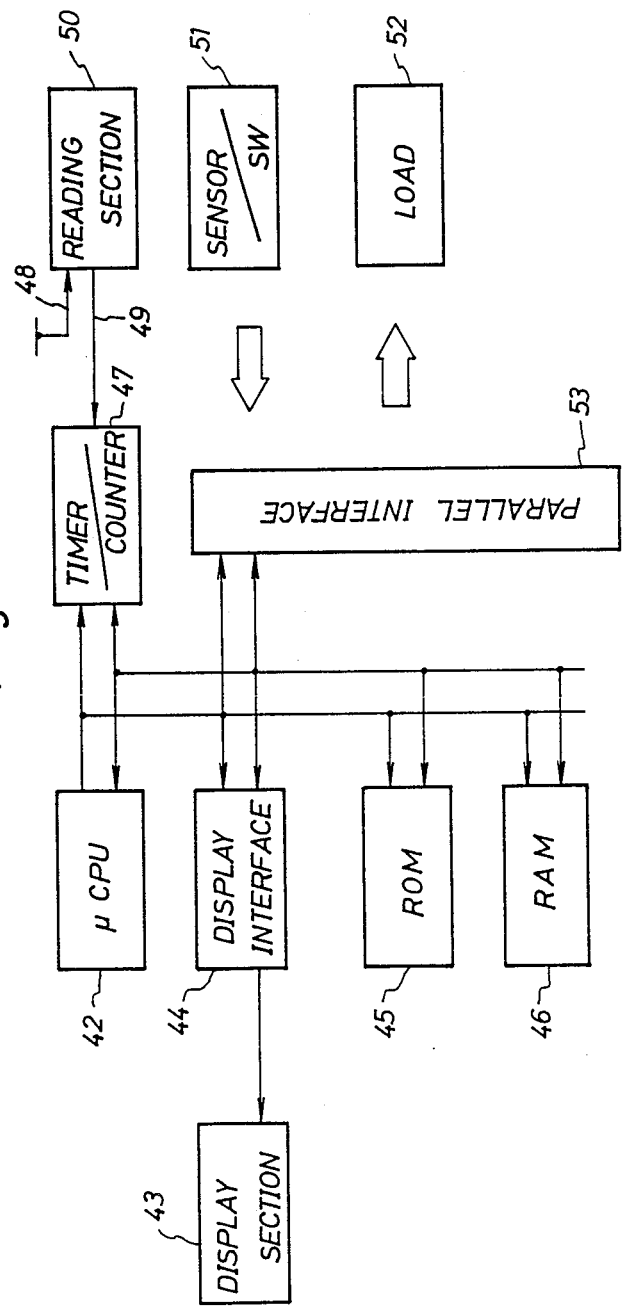

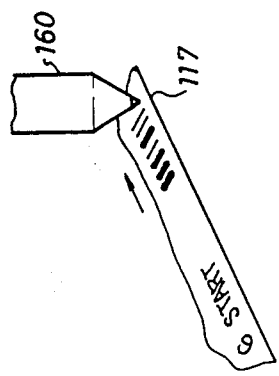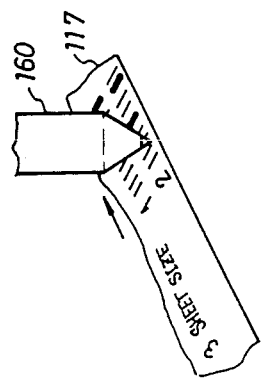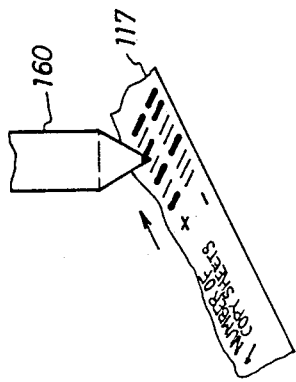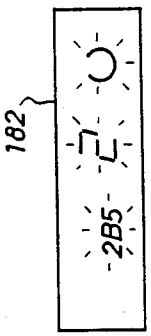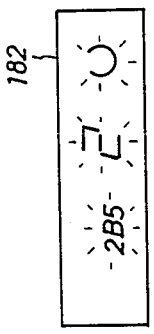

Fig. 25
| MODE SECTION | MODE CODE | NUMBER OF SHEETS | COPY DENSITY | SHEET SIZE | MAGNIFICATION | CLEAR STOP | START |
|---|---|---|---|---|---|---|---|
| DATA SECTION | | 0<br>+ :0<br>− :1 | 1<br>+ :0<br>− :1 | 2<br>+ :0<br>− :1 | 3<br>+ :0<br>− :1 | 4<br>— | 5<br>— |
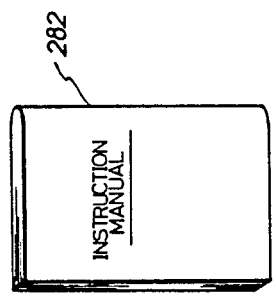
Fig. 28
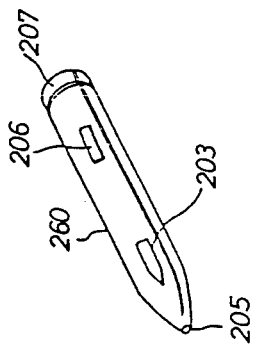
Fig. 27
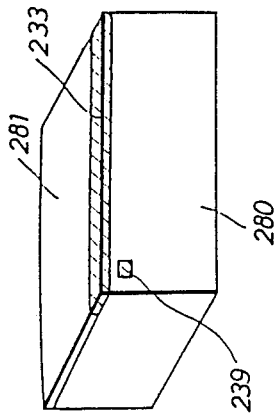
Fig. 26

| MODE SECTION | MODE | TRIMMING | MASKING | MAGNIFICATION | MOVE |
|---|---|---|---|---|---|
| | CODE | 60 | 61 | 62 | 63 | 64 |
| MODE SECTION | MODE | RED | GREEN | BREEN | — |
| | CODE | 65 | 66 | 67 | 68 | 69 |
| DATA SECTION | | — | — | — | — | — |

| START | MODE SECTION (1-DIGIT) | DATA SECTION (2-DIGIT) | STOP |
|---|---|---|---|

⟷ 13.2 mm

| MODE SECTION | MODE CODE | X-DIRECTION | Y-DERECTION |
|---|---|---|---|
| | | 7 | 8 |
| DATA SECTION (2-DIGIT) | | 00~99 | 00~99 |

| START | MODE SECTION (1-DIGIT) | DATA SECTION (2-DIGIT) | STOP |
|---|---|---|---|

| MODE SECTION | MODE | PROGRAM NO. | PROGRAM CANCEL | — | — |
|---|---|---|---|---|---|
| | CODE | 8 | 8 | 8 | 8 |
| DATA SECTION | | 00~89 | 90 | 91 | 92 |

| START | MODE SECTION (1-DIGIT) | DATA SECTION (2-DIGIT) | STOP |

| MODE SECTION | MODE | COLOR ADJUST | COLOR SELECT | — | — |
|---|---|---|---|---|---|
| | CODE | 6 | 7 | 8 | 9 |
| DETA SECTION | | 00~99 | 00~99 | 00~99 | 00~99 |

Fig. 59A  Fig. 59B
Fig. 60
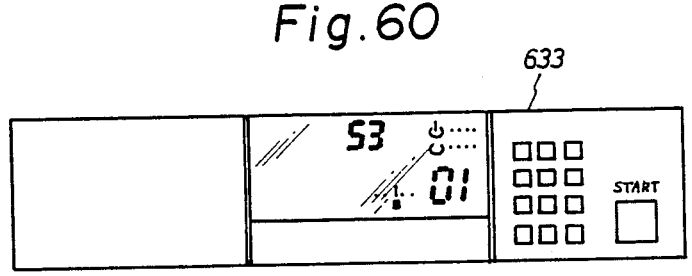
Fig. 61
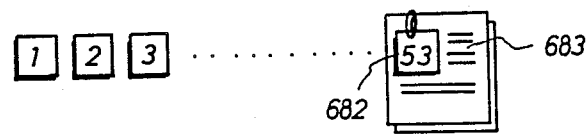

| MODE SECTION | MODE CODE | RECEIPT NUMBER | DEPARTMENT CODE |
|---|---|---|---|
| | | 7 | 8 |
| DETA SECTION (2-DIGIT) | | 00~99 | 00~99 |

| MODE SECTION | MODE CODE | COPY RATES SETTING | x100 | x10 | x1 | CANCEL |
|---|---|---|---|---|---|---|
| | | 90 | 91 | 92 | 93 | 94 |
| DATA SECTION (1-DIGIT) | | A3 : 0<br>B4 : 1<br>A4 : 2<br>B5 : 3 | 0<br>{<br>9 | 0<br>{<br>9 | 0<br>{<br>9 | — |

COPYING MACHINE HAVING A BAR CODE READER

BACKGROUND OF THE INVENTION

The present invention concerns a copying machine capable of setting various copying modes by reading bar codes.

With the increasing in the number of functions provided for copying machines in recent years, the number of operation keys mounted on a copying machine has been increased and the contents of instruction manuals have become complicated. Accordingly, it has become difficult for a user to rapidly set copy density, sheet size, number of copying sheets, magnification ratio, tone, etc. as well as to fully utilize the excellent functions provided for the copying machine.

Further, in a so-called editing copying machine having editing functions such as designation of a required portion of an original (trimming or masking), movement, enlargement, reduction, coloration, etc. of the required portion of the original, X- and Y-addresses of the required portion are inputted with keys or a pressure-sensitive editing board However, inputting the address by the keys takes time, and the editing board is expensive.

Furthermore, there have been proposed so-called programmable copying machines. However, it has not always been easy in these programmable copying machines to set programs and read out the programs for setting the copying mode. In addition, for executing management such as calculating copy charges on every department in a conventional copying machine, it is necessary to record a copying mode, number of copying sheets, etc. in an application form besides setting them to the copying machine.

SUMMARY OF THE INVENTION

The present invention has been made in view of the foregoing situations and the first object of the present invention is to provide a copying machine capable of automatically setting a desired copying mode by reading a bar code corresponding to the desired copying mode with a bar code reader from a sheet in which bar codes corresponding to various copying modes are printed.

The second object of the present invention is to provide a copying machine capable of automatically setting a desired copying mode by reading a bar code corresponding to the desired copying mode with a bar code reader from an instruction manual in which explanations for each of copying modes and bar codes corresponding to various copying modes are printed.

The third object of the present invention is to provide an editing copying machine having editing functions such as designation of a required portion of an original (trimming, masking), movement, enlargement, reduction, etc. of the required portion of the original, and capable of automatically setting a desired copying mode and address of the portion by reading a bar code corresponding to a desired copying mode and the address with a bar code reader from a sheet in which bar codes corresponding to various copying modes and X- and Y-addresses of the required portion of the original are printed.

The fourth object of the present invention is to provide a programmable copying machine capable of programming several copying modes, and capable of programming a desired copying mode by reading a bar code corresponding to the desired copying mode with a bar code reader from a sheet in which bar codes corresponding to various copying modes are printed.

The fifth object of the present invention is to provide a copying machine capable of automatically setting a copy color by reading a bar code corresponding to a copy color with a bar code reader from a sheet in which bar codes corresponding to various copy colors are printed.

The sixth object of the present invention is to provide a copying machine capable of automatically setting a copying mode and automatically conducting management such as calculating copy charges at every department by reading bar codes corresponding to desired copying modes, department to which a client belongs to, etc. with a bar code reader from a sheet in which bar codes corresponding to copying modes, departments are printed.

The first object of the present invention can be attained by a copying machine comprising a sheet in which bar codes corresponding to various copying modes are printed, a bar code reader for reading the bar codes from the sheet, a decoding section for decoding signals transmitted from said bar code reader and a control section for setting a copying mode based on data derived from said decoding section.

The second object of the present invention can be attained by a copying machine comprising an instruction manual in which explanations for various copying modes, bar codes corresponding to the copying modes and input procedures are printed, a bar code reading section for reading the bar codes from said instruction manual, and a control section for setting a copying mode based on signals transmitted from the bar code reading section.

The third object of the present invention can be attained by a copying machine comprising a sheet in which bar codes corresponding to addresses of a required portion of an original, a bar code reader for reading bar codes from said sheet and a control section for setting addresses in an editing mode based on signals transmitted from said bar code reader.

The fourth object of the present invention can be attained by a copying machine comprising a first sheet in which bar codes corresponding to various copying modes are printed, a bar code reader for reading the bar codes from said first sheet, and a control section for programming a mode comprising a plurality of the copying modes based on signals transmitted from the bar code reader while appending an index at a second sheet in which bar codes corresponding to indexes are printed, said copying machine being capable of setting the programmed mode by reading a bar code corresponding to the index from the second sheet with the bar code reader.

The fifth object of the present invention can be attained by a color copying machine comprising a sheet in which a plurality of colors and bar codes corresponding to the colors are printed, a bar code reader for reading the bar codes from said sheet and a control section for controlling copying colors depending on signals transmitted from said bar code reader.

The sixth object of the present invention can be attained by a copying machine comprising a sheet in which bar codes corresponding to a receipt numbers, department codes and copying modes are printed, a bar code reader for reading bar codes from said sheet and a control section for setting a copying mode and calculating copy charges on every department based on signals transmitted from said bar code reader.

The foregoing and other features, as well as advantages of the present invention will become apparent from the detailed description of preferred embodiments according to the present invention shown in the appended drawings, wherein

DESCRIPTION OF THE ACCOMPANYING DRAWINGS

FIG. 1 a conceptional diagram of the system according to the present invention;

FIG. 2 is a chart showing the correspondence between characters and codes in a bar code system applied to the present invention;

Figure 5:
Figure 6:
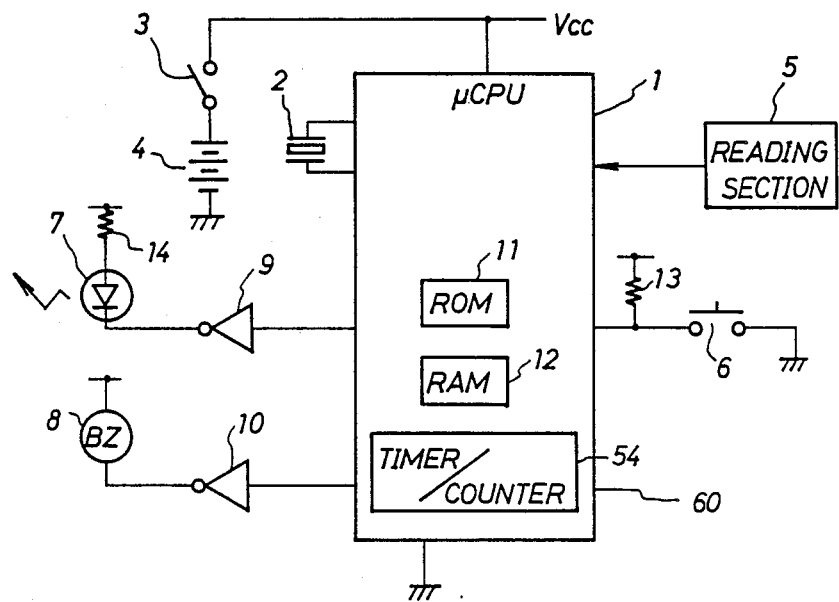
Figure 7:
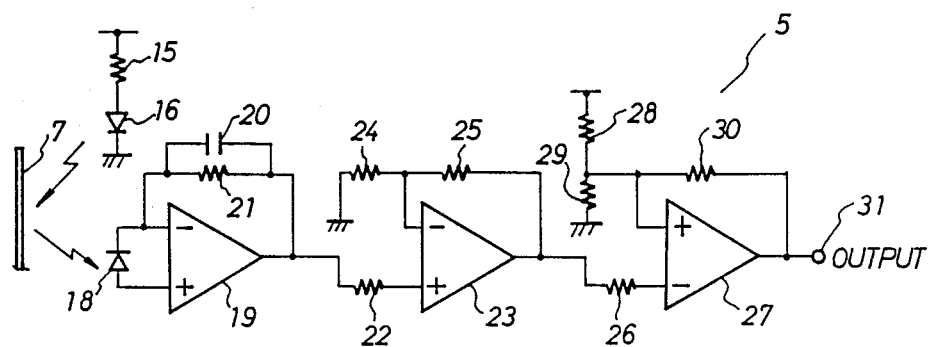
Figure 8:
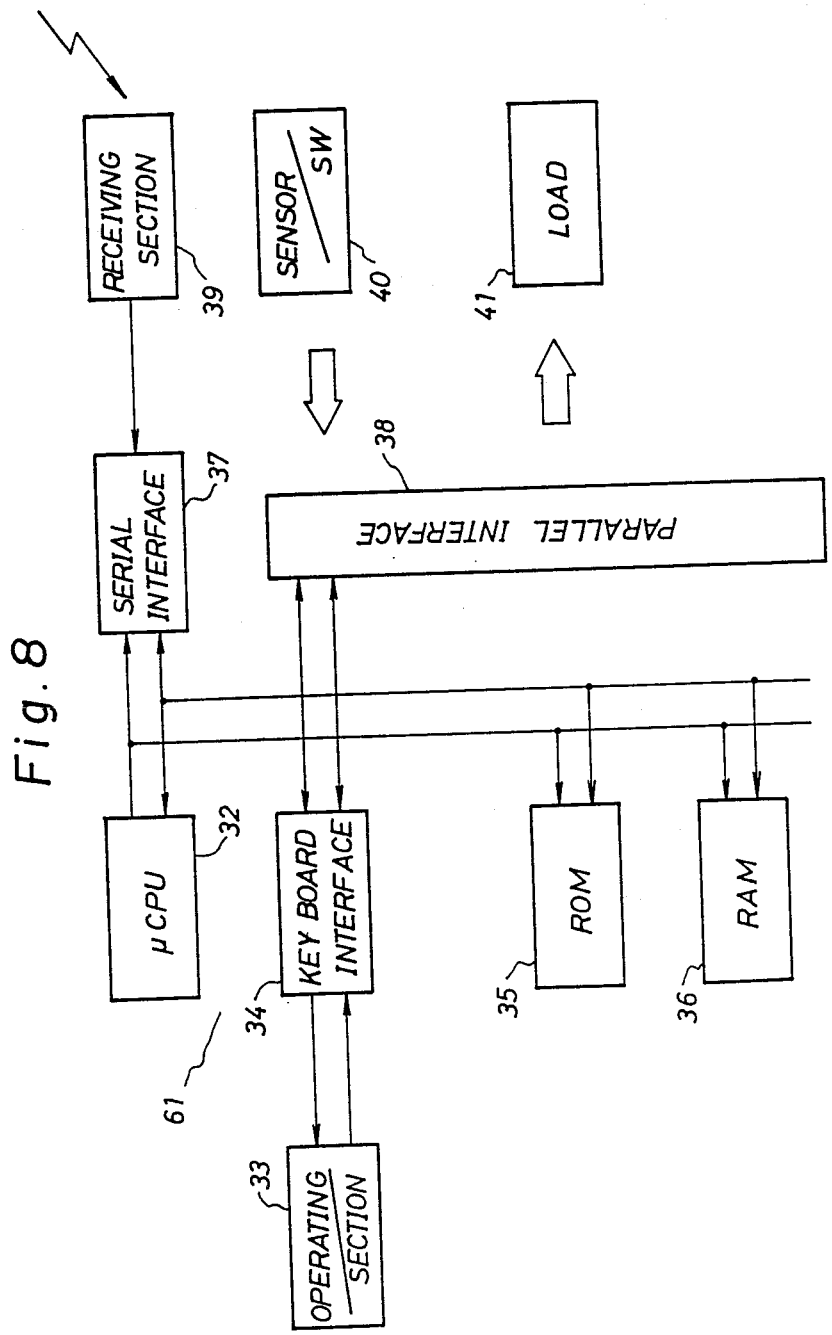
Figure 12:
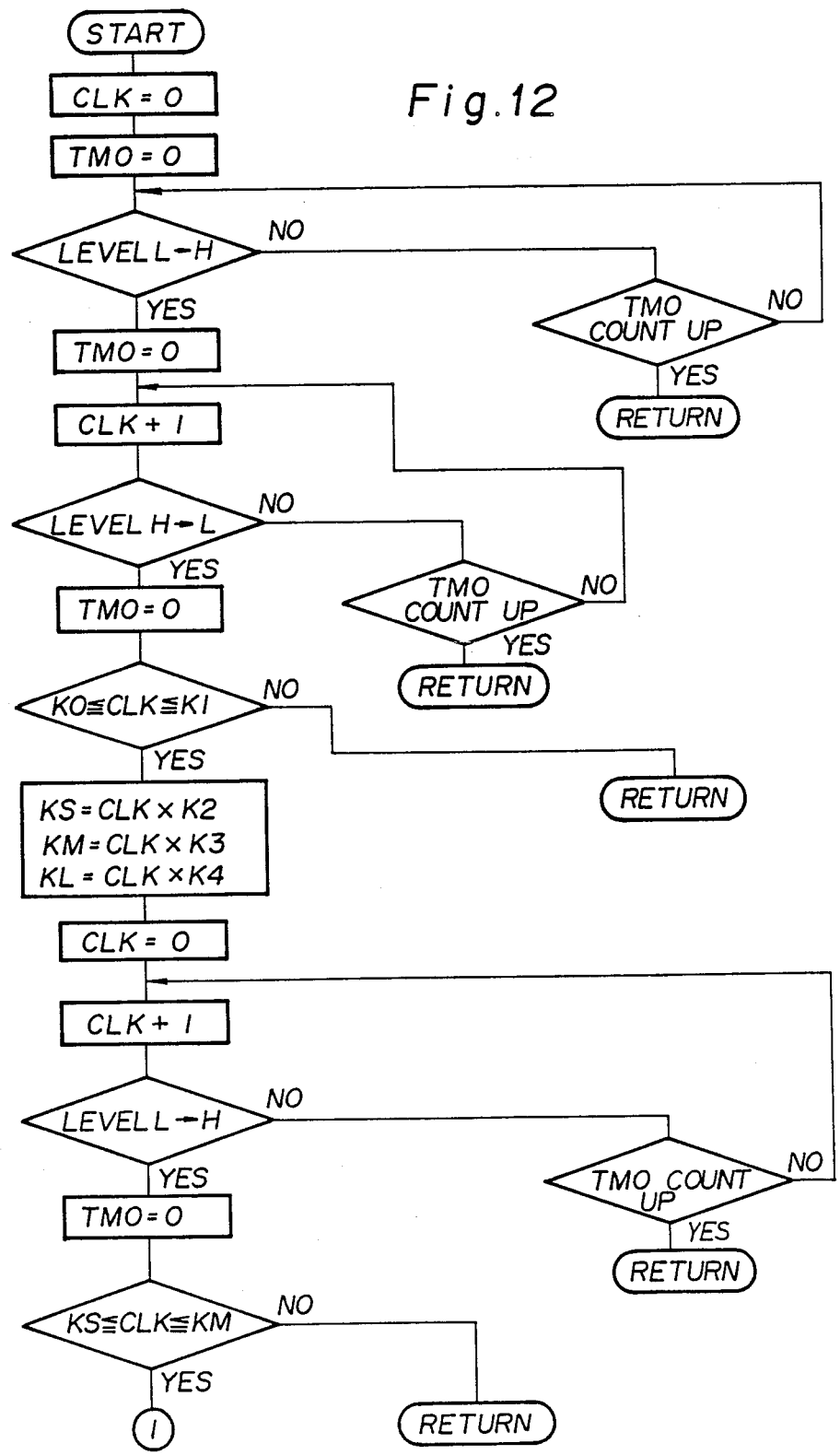
Figure 13:
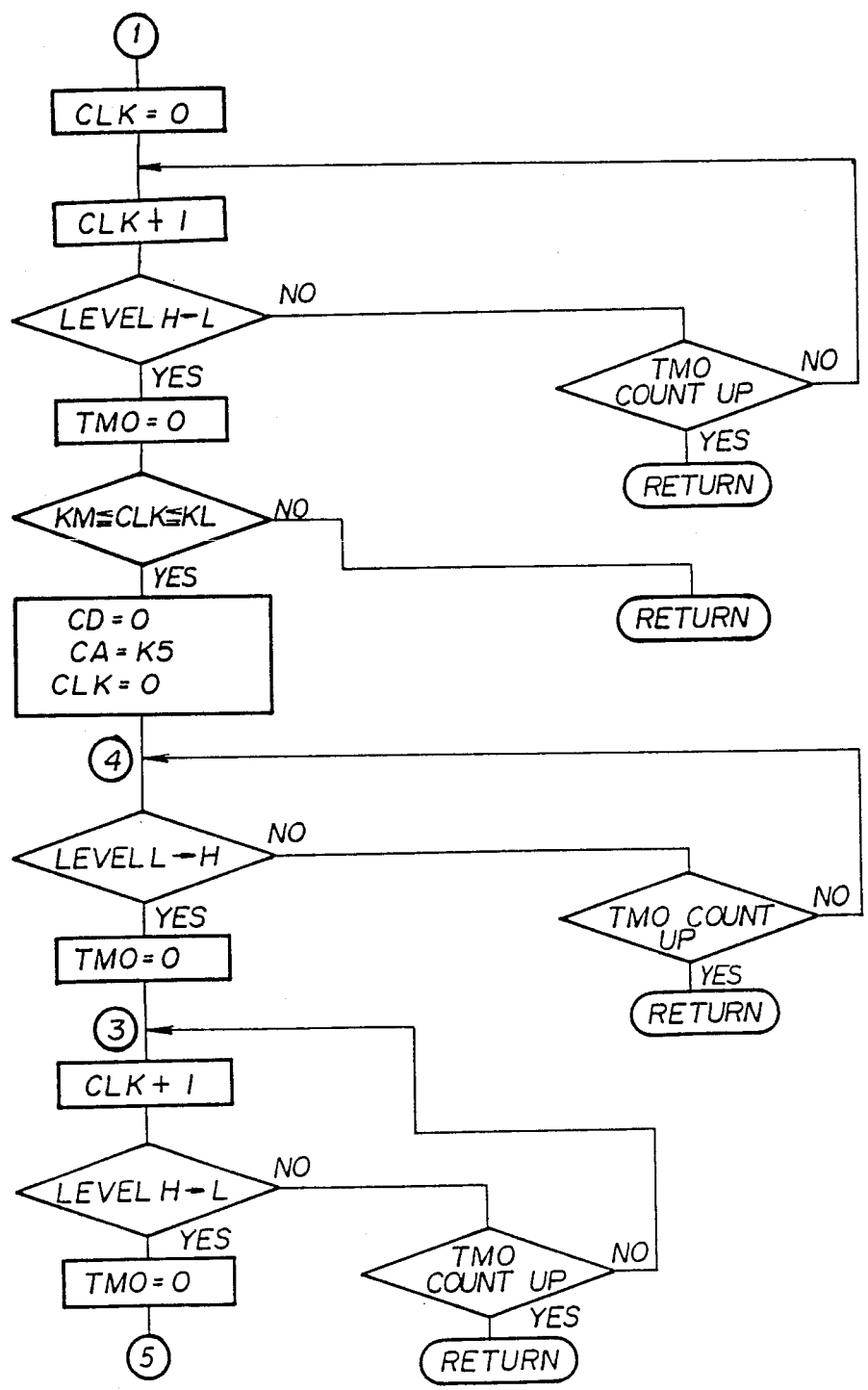
Figure 14:
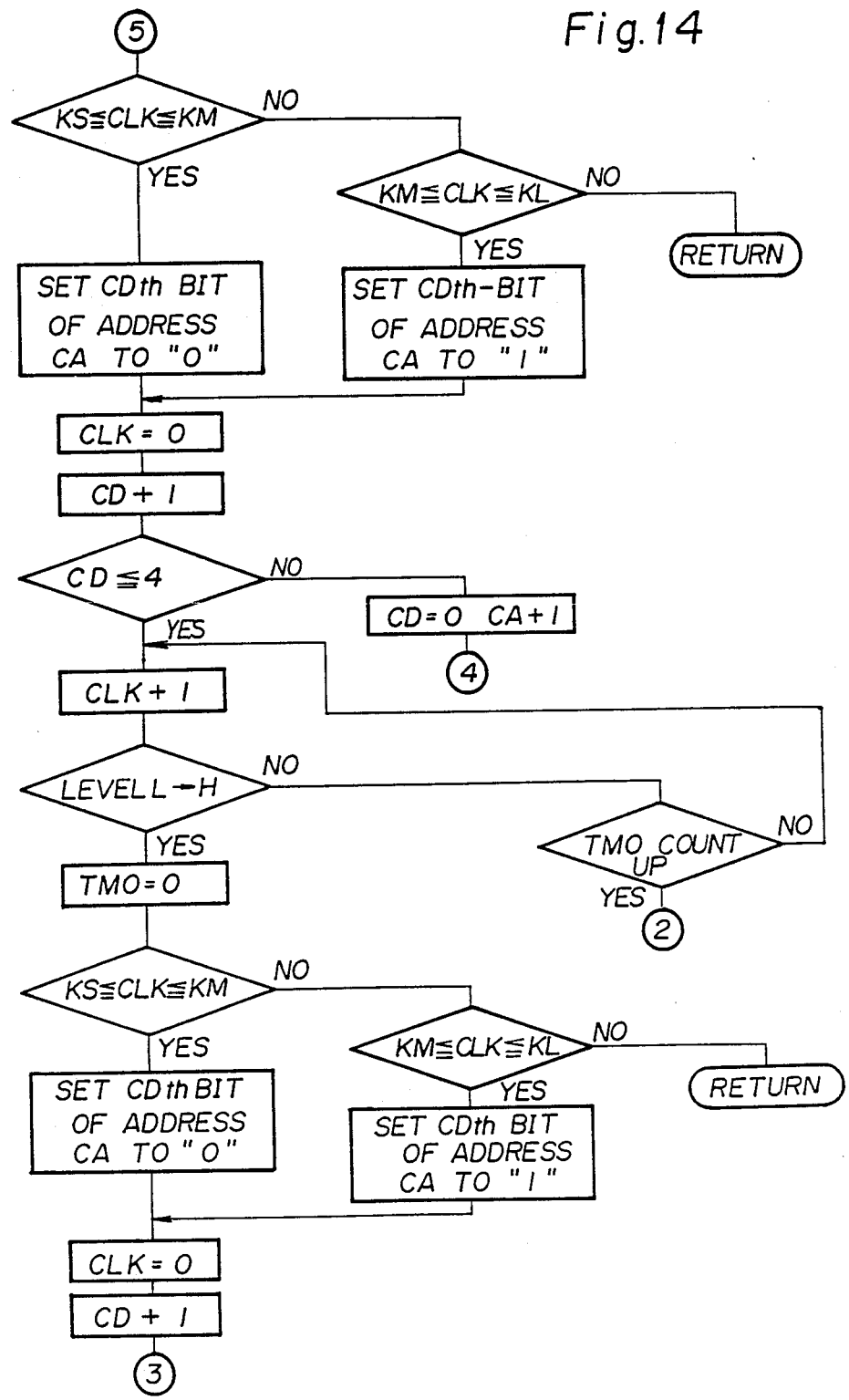
Figure 15:
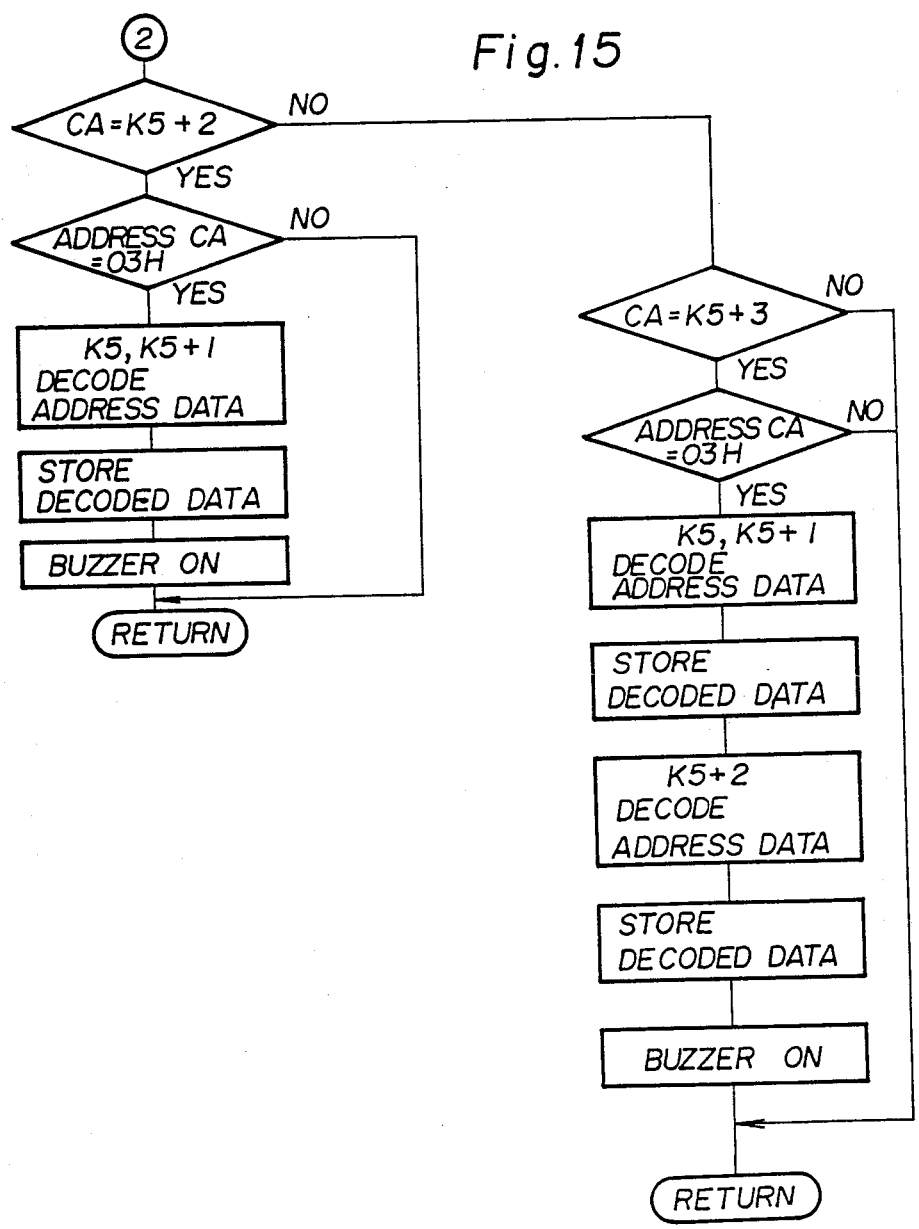
Figure 21:
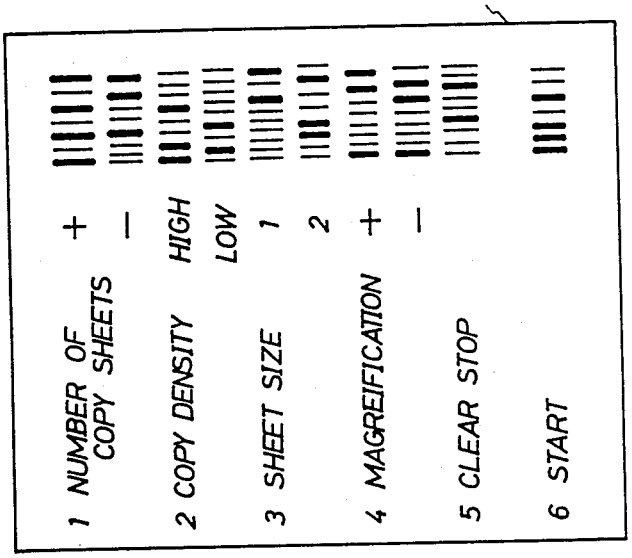
Figure 20:
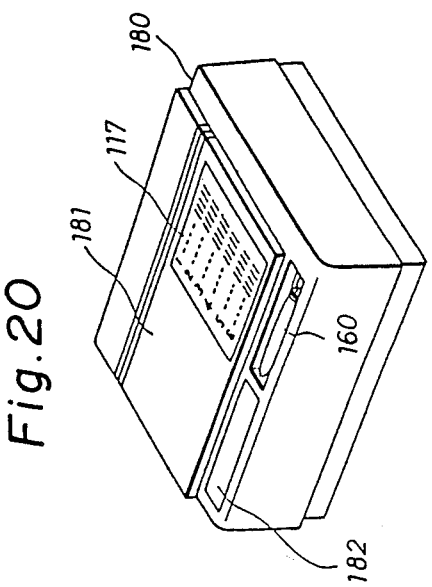
Figure 22:
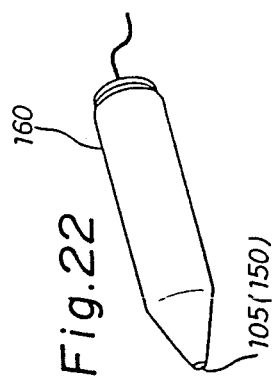
Figure 29:
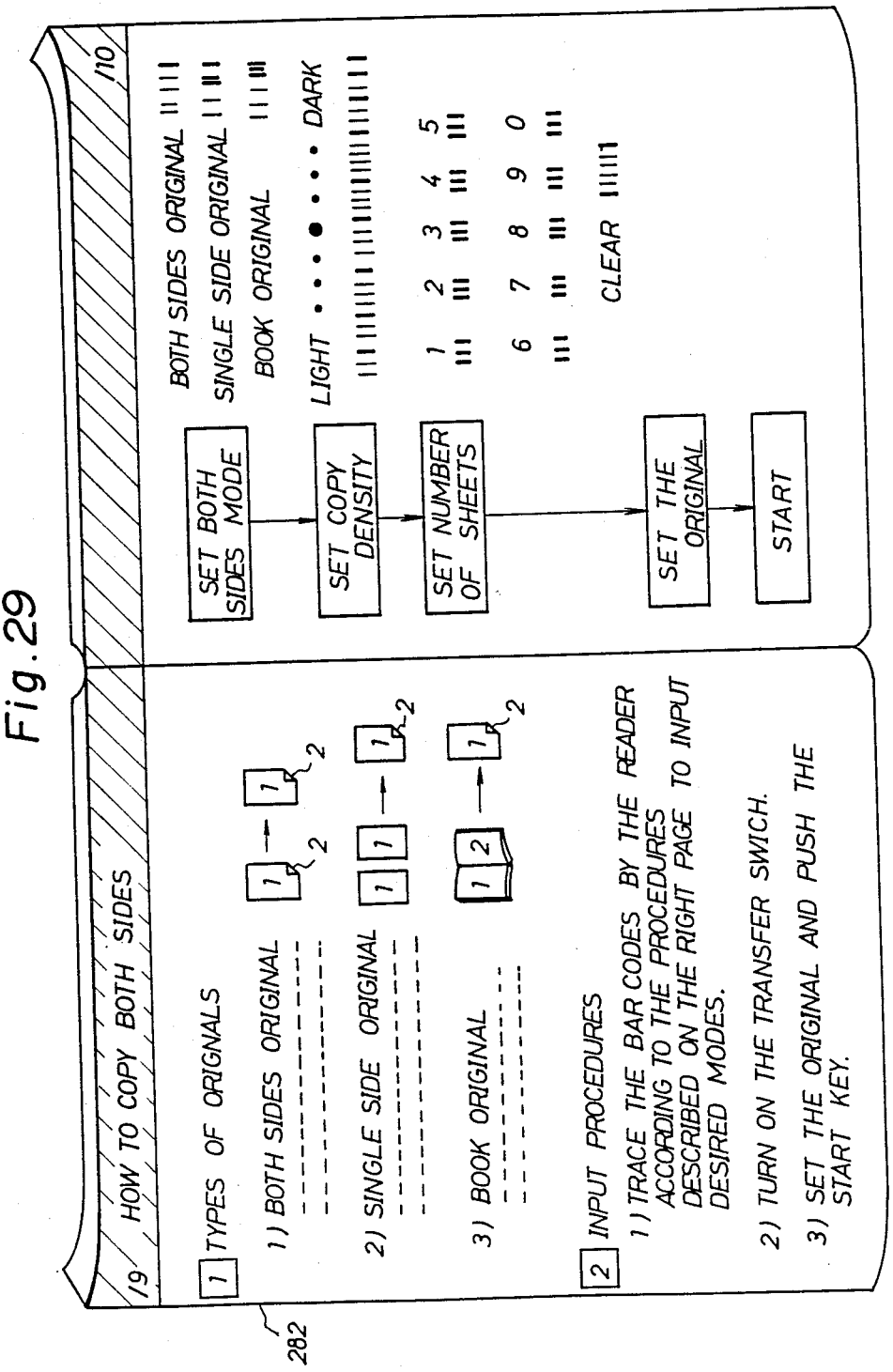
Figure 31:
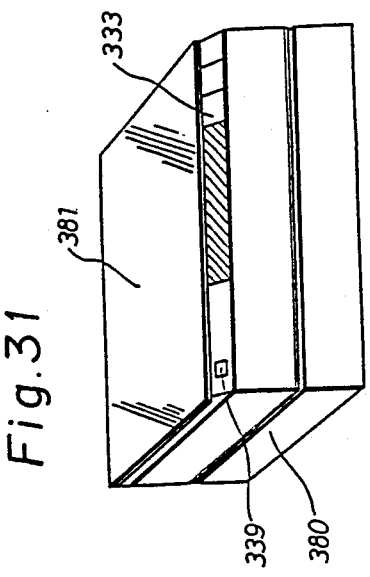
Figure 30:
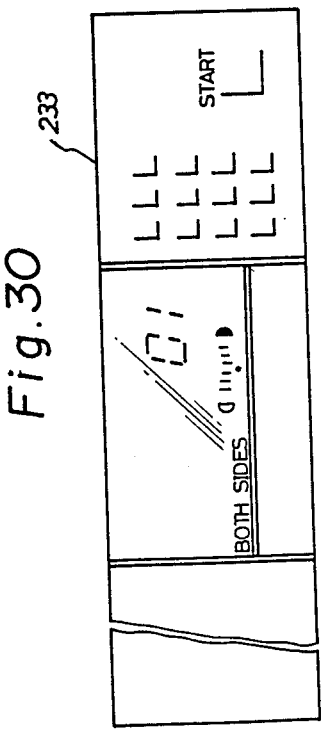
Figure 33:
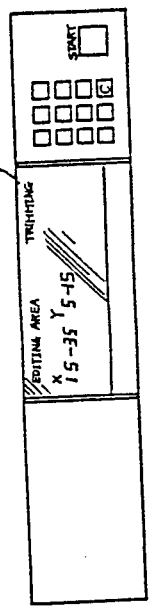
Figure 32:
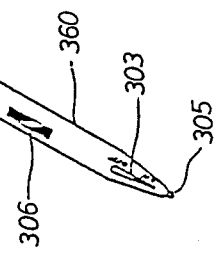
Figure 34:
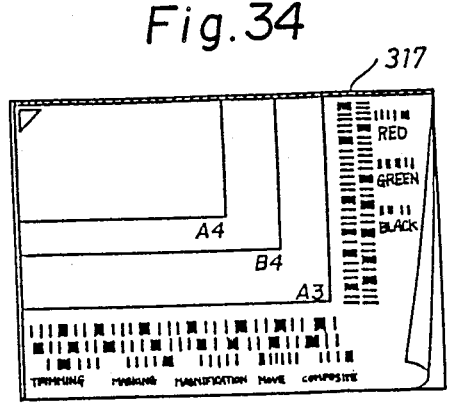
Figure 35:
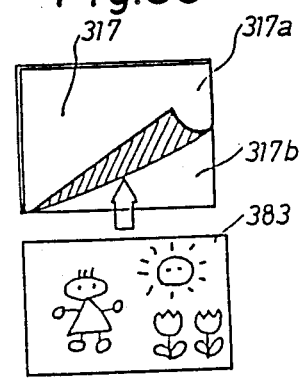
Figure 36:
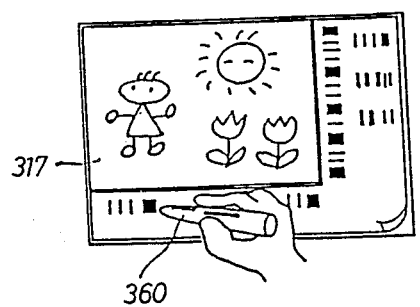
Figure 37:
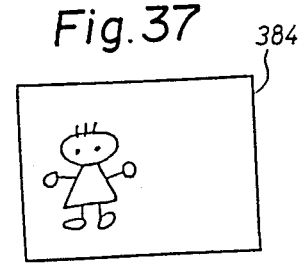
Figures 38, 39, 40, 41:
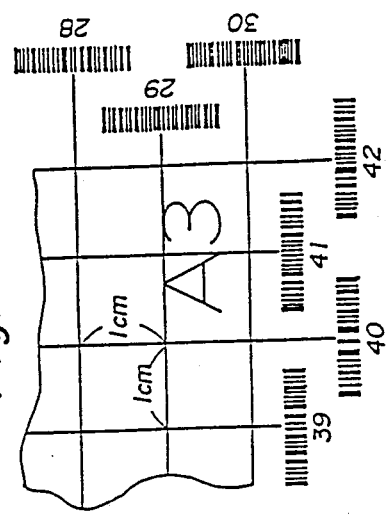
Figure 42C:
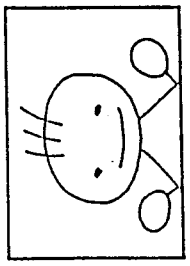
Figure 42B:
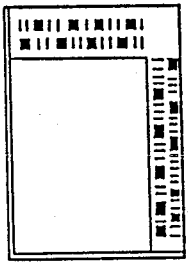
Figure 42A:
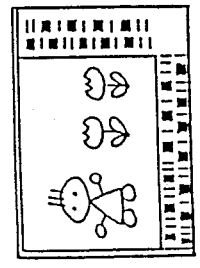
Figure 43C:
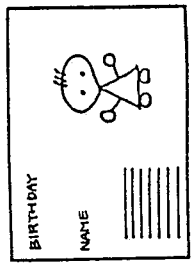
Figure 43B:
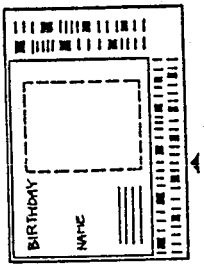
Figure 43A:
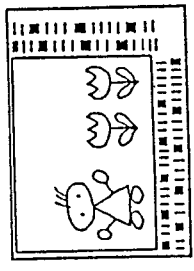
Figure 44C:
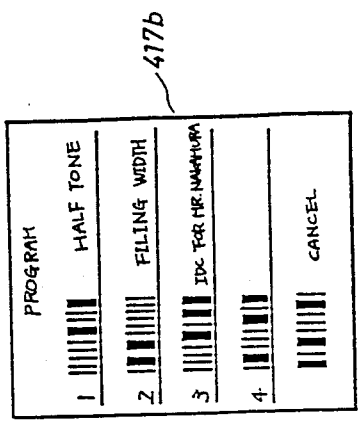
Figure 44B:
Figure 44A:
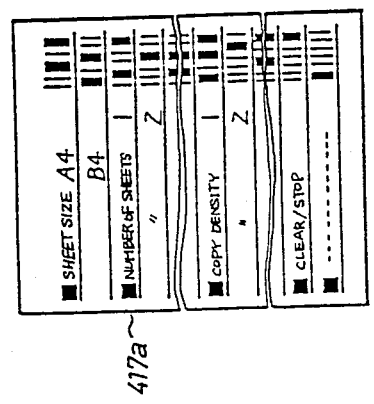
Figure 46B:
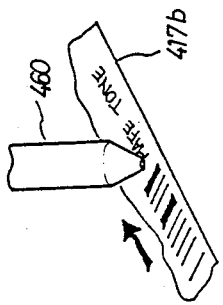
Figure 46A:
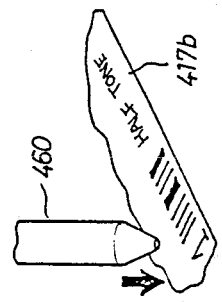
Figure 45:
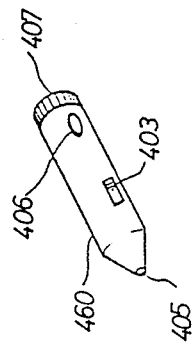
Figures 47, 48, 49:
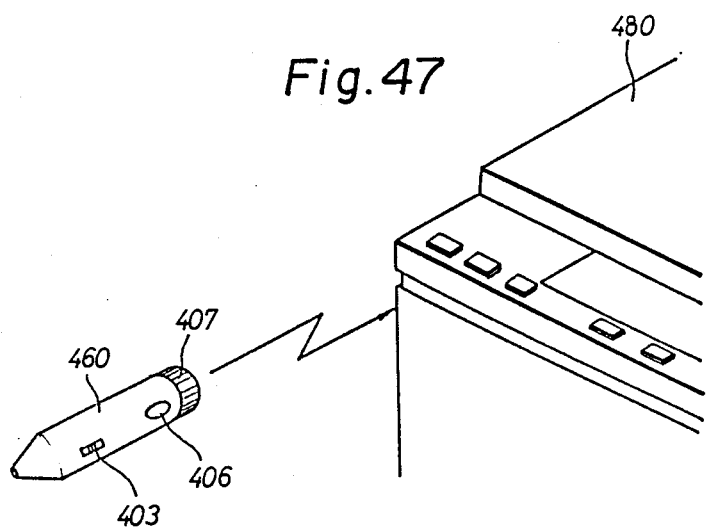
Figure 50A:
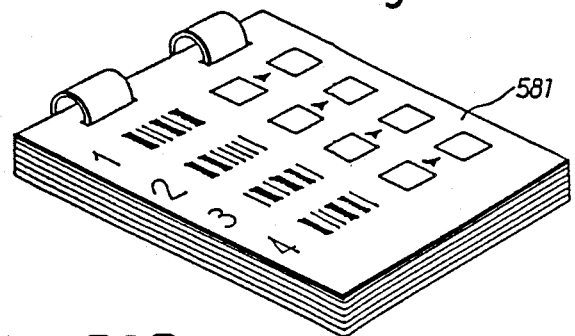
Figure 50B:
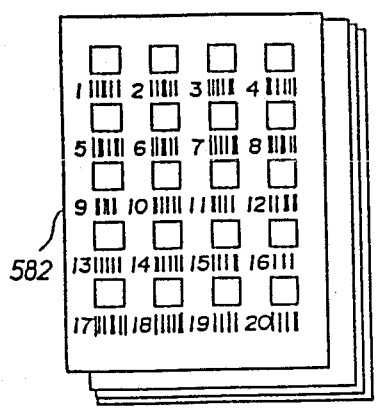
Figure 51:
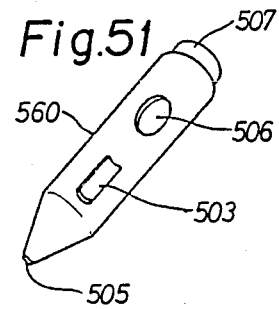
Figure 52A:
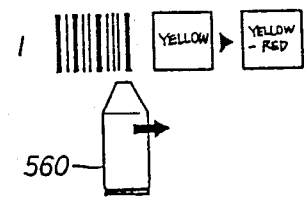
Figure 52B:
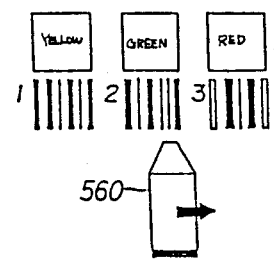
Figures 53, 54, 55:
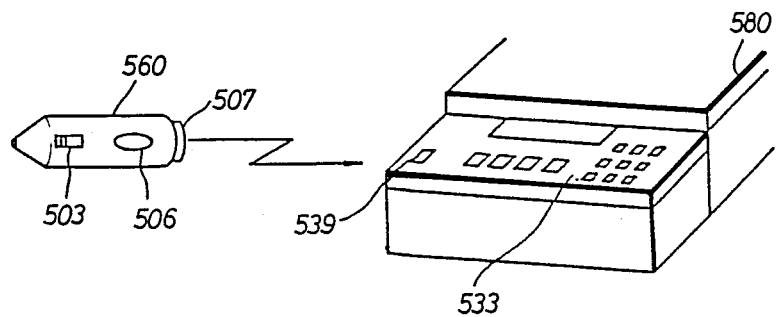
Figure 56:
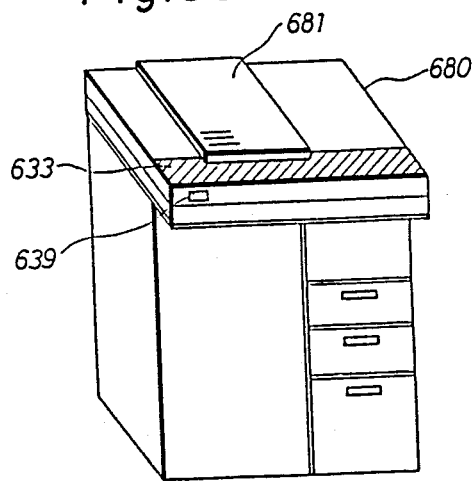
Figure 57:
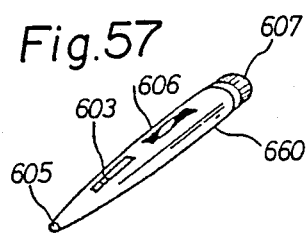
Figure 58:
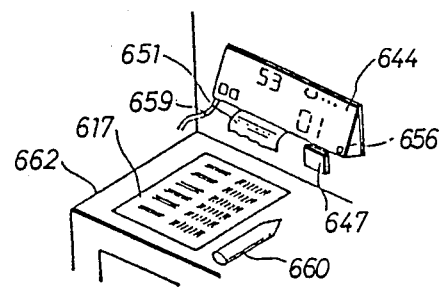
Figures 62, 63, 64:
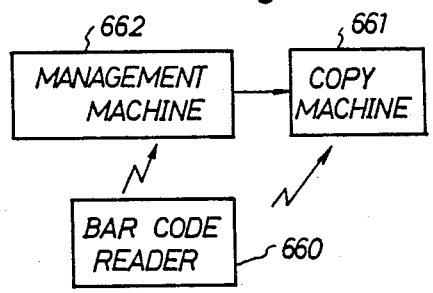
Figure 65:
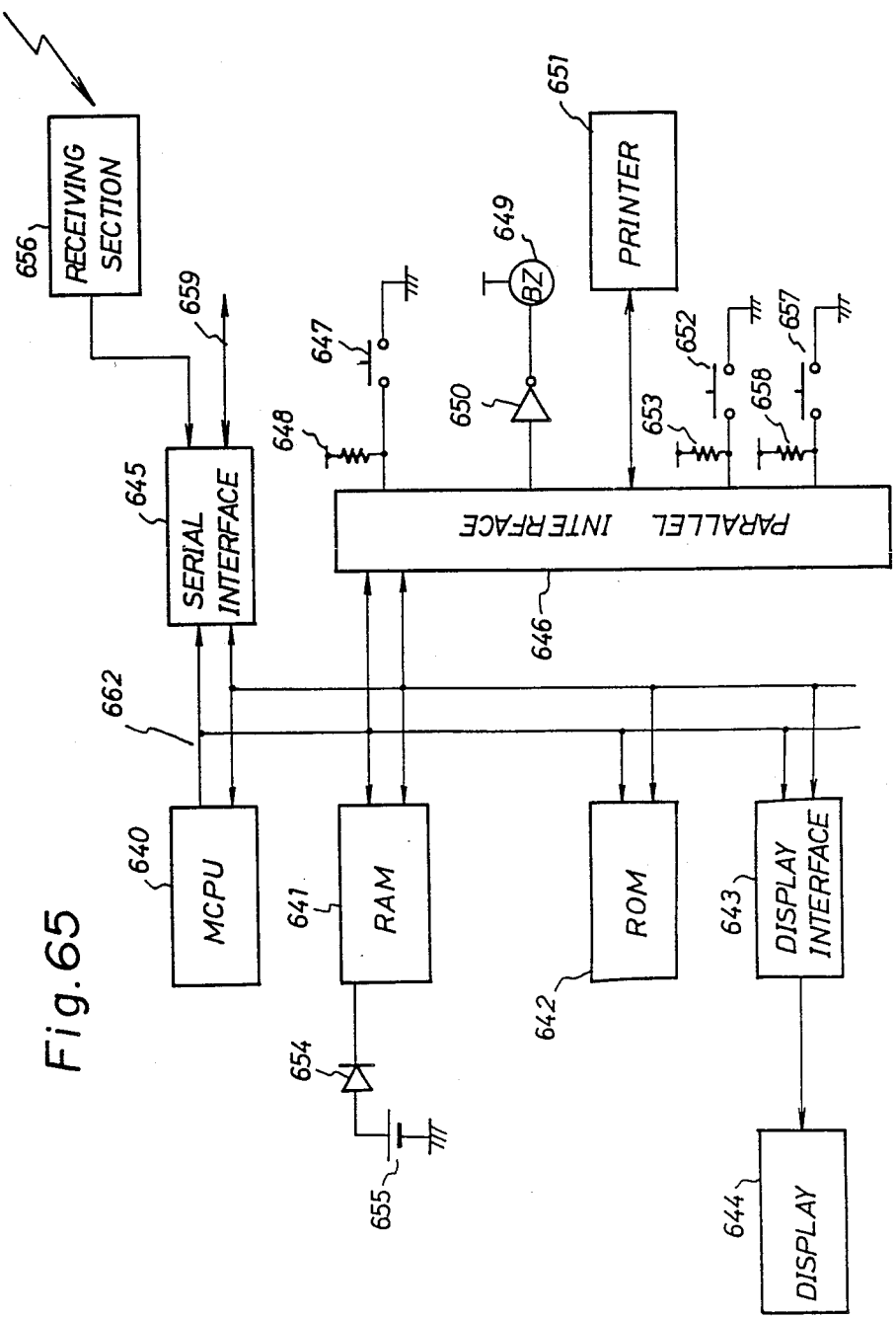

FIGS. 5(1), (2), (3) and (4) are views to explain how bar codes are read and processed by a bar code reader;

FIG. 6 is a diagram showing a specific circuit structure of the bar code reader;

FIG. 7 is an internal circuit diagram of the reading section thereof;

FIG. 8 is a block diagram of the control section of the main body;

FIG. 9 and FIG. 10 are views showing the fundamental constitution of bar codes printed in bar code sheets;

FIG. 11 is a chart showing codes corresponding to keys and special modes,

FIGS. 12, 13, 14 and 15 are control flow charts showing decoding steps executed in a bar code reader;

FIG. 16 is a view illustrating the pulse width for judging whether the scan speed is within a predetermined range;

FIGS. 17A and 17B are views showing decoded data in each of the addresses;

FIGS. 18A and 18B are views showing the constitution of bar codes in a copying machine having relatively small number of functions;

FIG. 19 is a block diagram of the control section of the main body of a copying machine having a relatively small number of functions;

FIG. 20 is a perspective outer looking view of a copying machine of the first embodiment according to the present invention;

FIG. 21 is a chart illustrating a sheet in which bar codes corresponding to various operation modes are printed;

FIG. 22 is a view illustrating a bar code reader;

FIGS. 23A, 23B and 23C are views showing the procedure for reading each mode from the sheet with a bar code reader;

FIGS. 24A, 24B and 24C are views illustrating the displaying state of a display section corresponding to FIGS. 23A, 23B and 23C respectively;

FIG. 25 is a chart showing codes corresponding to input modes;

FIG. 26 is an outer looking view of a copying machine of the second embodiment according to the present invention;

FIG. 27 is an outer looking view illustrating a bar code reader;

FIG. 28 is an outer looking view of an instruction manual;

FIG. 29 is a view illustrating contents of the manual;

FIG. 30 is a plan view of the operating section;

FIG. 31 is an outer looking view of a copying machine of the third embodiment according to the present invention;

FIG. 32 is an outer looking view illustrating a bar code reader;

FIG. 33 is a plan view of the display section;

FIG. 34 is a plan view of an editing sheet;

FIG. 35 is a view showing the procedure for setting an original on the editing sheet;

FIG. 36 is a view showing the procedure for reading bar codes from the sheet on which the original is set by the bar code reader;

FIG. 37 is a view illustrating a copy of the original reproduced through editing operation;

FIG. 38 is a chart illustrating codes regarding the editing mode;

FIG. 39 is a chart illustrating the constitution of a bar code for addressing;

FIG. 40 is a chart showing correspondence between the address and the code;

FIG. 41 is a detailed view of the bar code for addressing;

FIGS. 42A, 42B and 42C are views explaining editing function of enlargement;

FIGS. 43A, 43B and 43C are views explaining editing functions of movement and composition;

FIGS. 44A, 44B and 44C are views illustrating bar code sheets used for the copying machine of the fourth embodiment according to the present invention;

FIG. 45 is a view illustrating a bar code reader;

FIGS. 46A and 46B are views showing the procedure for setting a program by a bar code reader;

FIG. 47 is a conceptional view for explaining mode setting in the copying machine of the fourth embodiment;

FIG. 48 is a chart illustrating the constitution of a bar code corresponding to a special mode;

FIG. 49 is a view showing the allocation of contents of the bar code;

FIG. 50 is a view showing a color chart used in the copying machine of the fifth embodiment according to the present invention in which FIG. 50A shows a chart for color-adjusting;

FIG. 50B shows a chart for color-selecting;

FIG. 51 is an outer looking view of the bar code reader;

FIGS. 52A and 52B are charts showing the procedure for color-adjusting and color-selecting with the bar code reader;

FIG. 53 is a view illustrating data transferring from the bar code reader to the main body of the copying machine;

FIG. 54 is a chart illustrating the constitution of a bar code for a special mode printed in a bar code sheet;

FIG. 55 is a chart showing contents of the code corresponding to special mode used in the present invention;

FIG. 56 is an outer looking view of a copying machine of the sixth embodiment according to the present invention;

FIG. 57 is an outer looking view of a bar code reader;

FIG. 58 is an outer looking view illustrating a main portion of a management machine;

FIGS. 59A and 59B are views showing sheets in which bar codes corresponding to departments and general purpose bar codes are printed respectively;

FIG. 60 is a plan view of the operating section;

FIG. 61 is a view showing the original and a receipt No. card attached thereto;

FIG. 62 is a conceptional system diagram in a case where there is a management machine;

FIGS. 63 and 64 are views illustrating codes corresponding to special modes; and FIG. 65 is a view showing a control block diagram of the management machine.

DETAILED DESCRIPTION OF PREFERRED EMBODIMENTS

Description will be made at first of a bar code reader used in the copying machine according to the present invention while referring to FIG. 1 through FIG. 19.

As shown in FIG. 1, a bar code reader 60 comprises a reading section for reading bar codes, a decoding section for decoding output signals derived from the reading section into character data, a memory section for storing the decoded character data orderly and a transmitting section for transmitting the character data in the memory to a control of a main body. The controller 61 of the main body comprises a control section and a receiving section for receiving signals transmitted from the bar code reader 60.

FIG. 2 shows the correspondence between characters and codes in 2 out of 5 code which may be used at present invention. The 2 out of 5 code has the following features:

(1) One character is composed of three fine bars and two thick bars, that is, five bars in total.

(2) There are two exclusive codes for START and STOP each composed of one fine bar and two thick bars.

(3) A spacing having a certain width is required before and after the START and STOP codes.

(4) A gap greater than the fine bar is required between adjacent characters.

(5) There are two methods. One uses a space between adjacent black bars merely as a space not having significance, and the other uses the space as a white bar having significance.

(6) The number of digits is variable.

There are other bar code systems for example:

(1) NY-7

(2) CODE 39

(3) Common good code (JIS B 9550), etc.,

The 2 OUT OF 5 code having spacing with significance is basically used in the present invention.

Figure 3:

FIG. 3 shows one example of 2 OUT OF 5 code system (spacing with no significance).

Figure 4:
FIG. 3 and FIG. 4 are, respectively, views showing a bar code sample in a case where there is no significance in each spacing and another sample in a case where there is significance in each spacing.

FIG. 4 shows one example of 2 OUT OF 5 code system (spacing with significance).

FIG. 5(1), (2), (3) and (4) show how the 2 OUT OF 5 code (spacing with significance) is read and processed by the bar code reader 60 shown in FIG. 1. At first, the printed bar code is read in the reading section as a high level signal for the black portion and as a low level signal for the white portion and sent to the decoding section. Since the bar code reader 60 is a hand-held scanning type, the time interval between high and low signals derived from the reading section varies depending on the scanning speed. In the decoding section, the output signals are compensated for the scanning speed to distinguish a thick bar ("1") and a fine bar ("0") and further decoded into character data. The decoded data are stored in the memory. Finally, the memory data are sent to the controller 61 of the main body in an asynchronous mode having a start bit and a stop bit under receipt of signals from a transfer switch. The figure shows that data 45H (01000101B) is being sent from the least significant bit.

FIG. 6 shows a specific circuit structure of the bar code reader 60. The decoding section, the memory section and the transmitting section constitute one chip microcomputer, except the reading section 5.

One chip microcomputer 1 comprises a ROM 11 storing a control program including decode processing program, fixed data, etc., a RAM 12 for storing read data and decoded data, etc., CLK used for detecting the pulse width of signals derived from the reading section and a timer/counter 54. A crystal oscillator 2 is adapted to generate system CLK for a circuit not shown of the one-chip microcomputer, as the reference of the internal timing of the CPU and also as the base CLK for the timer/counter section 54.

The bar code reader 60 is driven by electric cells 4 by way of power switch 3 since it is independent of the main body of the copying machine. A transmitting switch 6 is disposed together with a pull-up resistor 13 for transmitting the decoded data stored in the memory (RAM) 12 to the main body. A LED 7 is disposed for receiving the information from an asynchronous communication port in the CPU and converting the data into photo signals. An infrared emission LED is used for this purpose.

A current limiting resistor 14 and a driver 9 are disposed for the LED 7. A buzzer 8 is adapted to generate a confirming sound when the bar code data read by the reading section 5 has been correctly decoded. A driver 10 is attached therefor. Description will be made specifically later of the control program in the ROM 11 while referring to the decoding processing which is the main function of the bar code reader.

FIG. 7 shows an internal circuit of the reading section 5.

There are disposed a light emitting element (LED) 16 and a current limiting resistor 15 therefor. The light emitted from the light emitting element 16 is reflected by a media (sheet) 17 in which the bar codes are printed and enters to a photoreceiving element (photodiode) 18. The current induced in the photoreceiving element 18 is converted into an electrical voltage through a current-voltage converter AMP 19, attached with a resistor 21 for determining its amplification ratio and a capacitor for eliminating noise components. The output of the current-voltage converter AMP 19 is inputted to an amplifier AMP 23. There are disposed resistor 22 for non-inverting input and resistors 24, 25 for determining the amplification ratio factor. The output of the AMP 23 is inputted to the inverting input of a comparator 27 by way of a resistor 26. A threshold voltage prepared through resistors 28 and 29 is inputted to the non-inverting input of the comparator 27. If the input voltage is lower than the threshold voltage, the output of the comparator 27 turns to a high level, whereas if the input voltage is greater than the threshold voltage, the output turns to a low level. A resistor 30 is disposed for providing the comparator 27 with hysteresis. The output of the comparator 27 is connected by way of an output terminal 31 to the one chip μCPU 1. When the reading section 5 is scanning the black bar, the output terminal 31 is at a high level, since the induced current is slight and the inverting input voltage of the comparator 27 is lower than the threshold voltage.

FIG. 8 is a block diagram of the controller 61 of the main body.

The controller 61 comprises a μCPU 32, a operating section 33, a key board/display interface 34, a ROM 35, a RAM 36, a parallel interface 38 for transferring signals between a sensor/switch 40 and a load 41 in the copying process, a receiving section 39 for receiving photo signals emitted from the bar code reader 60, and a serial interface 37 for converting serial signals received by the receiving section 39 into parallel signals.

The controller 61 conducts quite the same control as the keys on the operating section 33 except that the controller 61 makes a confirming sound by a buzzer not illustrated when the signals emitted from the bar code reader 60 have been received correctly through the serial interface 37. A mode confirmation display provided on the operating section 33 displays the mode inputted through the bar code reader 60 together with the confirmation sound.

FIGS. 9 and 10 show basic constitution of the bar code printed in the bar code sheet.

FIG. 9 shows the constitution of a bar code having a mode section of 2-digit, while FIG. 10 shows the constitution of a bar code having mode section of 2-digit and a data section of 1-digit appended to the mode section.

FIG. 11 shows a part of a code corresponding to various modes.

For example, a key numbered "5" is coded into "005", the upper tray is coded into "04" and the manual notch 4 for adjusting copy density is coded into "033". A code having a mode section first digit of which is from "6" to "9" is allocated for a special mode.

FIG. 12–FIG. 15 show program flows for explaining how the bar code reader 60 decodes the bar code having the constitution shown in FIG. 9 or 10.

For compensating fluctuation of an output signal wave form derived from the reading section due to the dispersion in the scanning speed in case of manual scanning, there are two methods. One comprises a first pulse width detecting system and the other comprises an entire width detecting system. The former is employed in the present invention.

Generally speaking, the entire flow is divided into four sections. The first section is for detecting the first pulse width, the second section is for detecting the start code, the third section is for detecting two or three character codes, and the fourth section is for detecting the stop code, decoding the code data and storing the decoded data into the memory.

In the first section, the pulse width of a signal corresponding to the first thick bar of the start code (high level) is measured by counting the number of the internal CLKs (outputted from the timer/counter 54).

The timer TMO gives a timing for interrupting the decoding operation when the signal level shows no change in a predetermined period of time and for judging whether all the signals have been read normally or not. Since the bar code has the constitution shown in FIG. 9 or 10 described above, if there is no level change in the predetermined period of time, the decoding is interrupted (flow is returned), and if the stop code is received when the number of pulses has reached a predetermined value, it is assumed that the bar code has been read normally. Accordingly, it is necessary to reset the bar code reader 60 before every reading.

At first, when the first pulse has arrived, that is, when there has been a level change, the width of the first pulse is measured.

If the measured value is within a predetermined range, it is assumed that the scanning speed of the bar code reader is normal, and the bar code is printed normally. Then, for classifying the successive pulses into thick bar ("1") or fine bar ("0"), constants K2, K3, K4 are multiplied respectively by the number of the CLKs corresponding to the first pulse to determine KS, KM, KL as threshold values for the classifying.

The relationship among KS, KM, KL is shown in FIG. 16. If the width of the second pulse following the first pulse is between KS and KM, it is assumed to be a fine bar ("0") and if it is between KM and KL it is assumed to be a thick bar ("1").

When the level has changed from L (low) to H (high) that is when the measurement of the second pulse of the start code has ended, it is detected that the second pulse of the start code is of a fine bar ("0"). When the level has changed from H to L, that is, when the measurement of the third pulse has ended, it is detected that the third pulse of the start code is of a thick bar ("1"). If the start code is read correctly, the data counter CD for indicating the number of the received pulses of the character code is reset, and the address counter AD for indicating the memory address in which the read character is stored is set at K5, and the process for decoding the character code is started.

When one character code comprising five pulses of high level, low level, high level, low level and high level has been decoded, the data counter CD is reset again and the content of the address counter AD is increased.

Then, the next character code is decoded. In this way, decoding of the character code is executed two or three times and decoding of the stop code following the character code is also executed. After the decoding of the stop code, the flow gets out of the decoding routine and goes to a routine for decoding 2 OUT OF 5 character code into an ordinary binary code. In case of a two digit bar code, if CA=K5+2 is 03H, that is, if it is a stop code, 2 OUT OF 5 code at the addresses K5 and K5+1 in which the character codes are stored are decoded into binary codes, the binary codes are stored at specific memory addresses and a buzzer is turned ON as the confirmation sound for indicating the completion of the decoding to complete the routine. In case of a three digit bar code, if CA=K5+3 are 03H, 2 OUT OF 5 code at the addresses K5, K5+1 and K5+2 in which the character codes are stored are decoded into binary codes. Decoding of this case is shown in FIGS. 17A or 17B.

FIG. 18 shows another constitution of a bar code used in the copying machine according to the present invention.

FIG. 18A shows a constitution having a mode section comprising only one digit, while FIG. 18B shows a constitution having a mode section and a data section each comprising one digit. Since there are two digits in total in the mode section and the data section, it is possible to set 100 kinds of codes.

FIG. 19 is a block diagram showing the control section of the main body of the copying machine of another embodiment according to the present invention.

The bar code reader comprises only the reading section 50 and the power source is supplied from the main body by way of a line 48.

The decoding section and the memory section are included in the controller of the main body.

The reading section comprises the circuits equivalent to those shown in FIG. 7 and output signal 49 therefrom is directly inputted to a timer/counter section 47 of the control section of the main body. The method of processing the inputted signal is substantially identical with the method described referring to FIG. 17 and other preceding figures. However, since the signal derived from the reading section 50 is directly inputted to the control section of the main body, a transmitting device and a receiving device, as well as a control program therefor are no more required.

While the devices 42, 45, 46 and 51, 52, 53 are identical with those described in FIG. 8 respectively but the devices 43 and 44 are partially different. Basically, the operating section 43 has no inputting keys, but it is comprised of only a display section. It is so adapted to conduct the mode setting only with the signals transmitted from the bar code reader, for making the machine compact.

The buzzer for the generating the confirmation sound for confirming the exact reading of bar codes may be disposed either at the main body or at the bar code reading section.

Description will be made of the first embodiment of the present invention while referring to FIG. 20 through FIG. 25.

In FIG. 20, there are shown a main body 180 of a copying machine, a retainer 181 on a contact glass and a bar code sheet (operating code list) 117 disposed at a portion of the retainer 180, contents of which are shown in FIG. 21, a bar code reader 160 stowed in a recess of the main body 180 of the copying machine, and a display section 182.

That is, in the copying machine according to this embodiment, the operating section comprises the bar code reader 160 and the display section 182, and all of the conventional keys are replaced with the bar code reader 160 (A set of keys may be disposed for setting copy mode).

A list of the copying modes and corresponding bar codes are printed in the sheet 117. When a necessary bar code is traced by the bar code reader 160 as shown in FIG. 23, a necessary inputting is made at the main body. The sheet 117 is put on the retainer 181, it may be disposed at any place. It may be carried for individual use. Furthermore, the material of the sheet may be paper or printable resin.

The bar code reader 160 has a bar code reading section 105 (150) and a power source switch. It may be attached with a cord, or it may be of a cordless type.

An operator turns on the power source of the bar code reader 160, selects a necessary mode out of several modes printed in the sheet 117 and traces the code corresponding to the mode by the bar code reader 160. The mode inputted through the bar code reader 160 can be confirmed as the display section 182 displays the mode. Finally, when the bar code corresponding to the start mode in the sheet 117 is traced, the display indicates that the copying is enabled.

FIG. 25 shows contents of codes used in the copying machine according to the present invention.

They are constituted with 2-digit codes such as "00" for increasing number of copies, "01" for decreasing number of copies, "10" for increasing copy density and "11" for decreasing copy density; and with 1-digit codes such as "4" for clear/stop and "5" for start.

The second embodiment according to the present invention will be described while referring to FIG. 26 through FIG. 29.

A main body 280 of a copying machine shown in FIG. 26 has the same functions as those in the conventional copying machine, but it further comprises a receiving section 239 for receiving signals emitted from a bar code reader 260, a display section and an operating section 233. Reference 281 denotes a retainer for retaining a document. The bar code reader 260 comprises a reading section 205, a power source switch 203, a transferring switch 206 and a transmitting section 207 for sending the read data to the main body 280 of the copying machine. In an instruction manual 282, operation methods and bar codes corresponding thereto are printed.

When an operator wants to take a both sides copy from a single side original for instance, he opens the instruction manual at a page in which "how to copy both sides" is printed, and traces the bar codes printed at the right page with the bar code reader 260 while reading the explanations printed in the left page. After the tracing, signals are sent from the bar code reader 260 to the main body 280, and displayed at the operating section 233. The operator sets the original, confirms the display section and pushes the start button, to obtain a both sides copy. Since the bar code reader 260 having a transmitting section is provided for a remote control system even if it takes time to set necessary modes the main body of the copying machine is not monopolized for that period of time.

The third embodiment according to the present invention will be explained referring to FIG. 31 through FIG. 43.

A main body 380 of a copying machine shown in FIG. 31 has the same functions as those in the conventional copying machine, but it further comprises a receiving section 339 for receiving signals emitted from a bar code reader 360 and an operating section 382 capable of displaying editing data.

The bar code reader 360 has such a shape as can be held with ease (for example, pen-like shape) and comprises a reading section 305, a power source switch 303, a transmitting switch 306 and a transmitting section 307 for sending the read data to the main body 380.

An editing sheet 317 comprises a substrate paper 317b and a transparent sheet 317a bonded at each one side, and can retain the original 383 put therebetween. Further, bar codes are printed on the surface of the sheet 317.

The bar code comprises two kind of codes, that is, a code for inputting the copy area (X mm from the left end of the original and y mm from the upper end of the original) and a code for inputting the mode (trimming, masking, red, green, etc.).

When an operator sets the original as shown in FIG. 35, and traces the bar codes on the editing sheet 317 by the reader 382 as shown in FIG. 36 to input desired data, signals are sent from the reader 382 to the copying machine shown in FIG. 31, and the input data are displayed in the operating section 333 as shown in FIG. 33.

When the operator sets the original to the copying machine after confirming the data at the display section 333 and pushes the start button, an edited copy such as a partially masked copy as shown in FIG. 37, a magnified copy, a multi-color print copy or a partially moved copy can be obtained.

FIG. 38 shows a code table regarding the editing mode as a special mode provided for the copying machine according to the present invention. For example there are provided "60" for trimming, "62" for magnification, "64" for red, etc.

FIG. 39 shows the constitution of a bar code having a mode section of 1-digit for directing a direction and a data section of 2-digit for directing the distance. The total length of the bar code is 13.2 mm when the width of the fine bar "0" is 0.33 mm.

FIG. 40 shows the constitution of the mode section and the data section of the bar code of FIG. 39. One digit in the mode section directs the X direction by "7" and directs the Y direction by "8", and the following two digits in the data section indicate the actual distance from an origin. For example, "732" indicates a position which is 32 mm distant from the origin in the X direction.

FIG. 41 shows a part of FIG. 34.

Lines are drawn at 1 cm intervals on the editing sheet 317 along the X direction and the Y direction.

Bar codes corresponding to the lines are printed up and down alternately.

The magnification mode shown in FIG. 42 is such a mode that a magnified copy shown in FIG. 42C can be obtained by inputting points ($X_1$-$X_2$) as shown in FIG. 42A and directing a desired magnification as shown in FIG. 42B with a bar code reader. Further, the composite/move mode shown in FIG. 43 is such a mode that a composite copy shown in FIG. 43C can be obtained by inputting points ($X_3$-$X_4$) of a first original as shown in FIG. 43A and directing the position corresponding to the point $X_3$ on a second original as shown in FIG. 43B.

The fourth embodiment according to the present invention will be explained while referring to FIG. 44 through FIG. 49.

In the copying machine according to this embodiment, a sheet shown in FIG. 44 and a bar code reader shown in FIG. 45 are used.

FIG. 44A shows a general purpose bar code input sheet while FIG. 44B shows a program input sheet.

Bar codes corresponding to various modes are printed in the general purpose bar code input sheet 417a. A desired program can be set by tracing the bar code with a bar code reader 460 shown in FIG. 45. FIG. 46A and FIG. 46B show this procedure. The bar code reader 460 is held vertically on the sheet 417a and then traced in the direction of an arrow.

The program input sheet 417b is provided for indexing and storing the programs set through the sheet 417a. FIG. 44C shows one practical example of the program input sheet 417b.

The bar codes reader 460 comprises a reading section 405 for reading bar codes, a transmitting section (LED) 407 for transmitting signals to the main body, a transferring switch 406 and a power source switch 403. The bar code reader is may be connected to the main body by way of a cord, or it may be of a cordless type.

The main body of the copying machine according to this embodiment comprises, in addition to conventional copying functions, a photoreceiving section for receiving signals corresponding to the program mode emitted from the bar code reader 460.

As shown in FIG. 47, the contents of data stored in the bar code reader 460 are sent by pressing a transferring switch 406 to the main body 460. Then the program comprising the contents of the data sent from the bar code reader 460 is indexed and stored in the sheet 417b shown in FIG. 44B.

After completing the above mentioned procedures, a designated program mode can be set by merely tracing a corresponding bar code on the program sheet 417b.

The mode setting can be confirmed by the sound from the bar code reader 460 and the sound from the main body or by the display in the operating section of the main body.

FIG. 48 shows the constitution of a bar code corresponding to a program mode as a special mode. It is composed of one digit in the mode section and two digits in the data section. FIG. 49 shows the allocation of codes in the program modes. The program mode is directed by "8" in the mode section and the program Nos are directed by "00"–"89" in the data section. Accordingly, if the capacity of RAM in the main body is sufficient, 90 items of copying modes can be programmed. The value "90" is for a cancel code, and mode setting is not conducted after "91".

The cancel code is a code for canceling the set program. When the cancel code is read and transferred to the main body, the contents of the program inputted before the cancel code on the side of the main body are cancelled.

Since the bar code reader used in this embodiment can accumulate and then send the contents of the bar codes, a programming work for a complicated mode (for example, editing, both sides copy, etc.) can be made at a place remote from the copying machine, and the copying machine is not monopolized for that period of time.

The fifth embodiment according to the present invention will be described while referring to FIG. 50 through FIG. 55.

A main body 580 of a copying machine shown in FIG. 53 comprises, in addition to the functions of a conventional copying machine, a photoreceiving section (sensor) 539 for receiving signals corresponding to the color mode emitted from a bar code reader 560.

The bar code reader 560 comprises a reading section 505, a power source switch 503, and a transferring switch 506 and a transmitting section 507 for transmitting the read data to the main body 580.

In a color chart 581, several bar codes for color-adjusting are printed together with pairs of color samples.

In a color chart 582, several bar codes for color-selecting are printed together with color samples. These color charts may be of a sheet type or a book type.

In case of color-adjusting, an operator traces a bar code corresponding to a desired pair of color samples on the color chart 581 with the bar code reader 560 as shown in FIG. 52A.

Then, the transferring switch 506 is pushed to transfer the data to the main body as shown in FIG. 53. Then, when the print button is pushed, copying at a designated mode is enabled.

In case of color-selecting, the operator traces a bar code corresponding to a desired color sample on the color chart 582 with the bar code reader 560 as shown in FIG. 52B. Then, the transferring switch 506 is pushed to transfer the data to the main body.

Then, when the print button is pushed, copying in the designated color is enabled.

FIG. 54 shows a constitution of a code corresponding to a special mode. It comprises three digits in total, that is, one digit in the mode section and two digits in the data section. The values "6"–"9" are assigned to the mode section.

FIG. 55 is a code table for special modes used in the present invention. The value "6" is assigned to the color-adjusting mode, while the value "7" is assigned to the color-selecting mode.

The main body of the copying machine confirms that the first digit of the code transferred from the bar code reader 560 is "6" or "7", thereby judging it to be a special mode, and then distinguishes a specific mode by the succeeding two digit data and sets the mode at the copying machine. The copying process is executed in the set mode under the usual control method upon receiving a print key ON signal from the main body 580 of the copying machine or from the bar code reader 560.

It is also possible to constitute a code for the special mode with one digit in the mode section and three digits in the data section. With this constitution, 1,000 types of modes can be set.

The sixth embodiment according to the present invention will be explained while referring to FIG. 56 through FIG. 65.

The main body 680 of the copying machine shown FIG. 56 comprises, in addition to conventional copying functions, a photoreceiving section (sensor) 639 for receiving signals corresponding to a mode inputted through a bar code reader 660.

The bar code reader 660 has such a shape as can be held with ease, and comprises a reading section 605, a power source switch 603, a transferring switch 606 and a transmitting section 607 for transmitting the read data to the main body or to a management machine 662.

The management machine 662 comprises a display section 644 having the same function as the copying machine, a transferring switch 647 and a cable 659 for transmitting the inputted data to the main body of the copying machine. It also has a printer 651 for printing out inputted copying mode, copy changes or management data etc. Reference 656 denotes a receiving section.

Codes representing various departments are printed in a department code input sheet 617a, by which calculating copy charges on every department can be conducted.

Codes for inputting receipt No. and copy modes, are printed in a general purpose bar code input sheet 617b. The receipt No. and the copy mode can be inputted by tracing the bar codes with the reader 660.

A client traces the bar code input sheet 617 with the bar code reader 660 to input a copy mode.

The management machine 662 displays the inputted mode.

The client confirms the content of the display and transfers it to the main body 680 by pushing the transferring switch 647. An original document 683 is passed to an operator together with a card 682 carrying the same number as the receipt No. inputted by means of the bar code as shown in FIG. 61. When the last copying is finished, the current receipt number and the inputted copy mode are displayed in the operating section 633.

The operator sets the original carrying the same number as the receipt No. which is indicated at the display section of the main body, and pushes the start button to take a copy in the designated mode. Further, the copy charges on every department are printed out in the form of a monthly report from the management machine 662.

FIG. 62 shows the entire constitutional view of this embodiment.

The signals emitted from the bar code reader 660 can be received by both the management machine 662 and the main body 661 of the copying machine. The main body 661 comprises a switch for inhibiting the main body from receiving the signals emitted from the bar code reader 660.

The management machine 662 and the copying machine 661 are connected by way of a serial interface so that they can transmit and receive signals with each other.

The management machine 662 also has functions of calculating the copy charges on every department in accordance with the copy rates set at the management machine 662 as described later and printing out them, as well as receiving the input signals from the bar code reader 660 and transmitting them to the main body 661 of the copying machine as described above.

If the system has not management machine 662, the copying machine 661 may be adapted to calculate the copy charges on every department.

FIG. 63 and FIG. 64 are code tables corresponding to special modes named copy center mode provided for the copying machine of this embodiment.

The copy center mode comprises a receipt No. code, a department code, a copy rates setting code, a code showing the figure at the hundred's place of the copy rates, a code showing the figure at ten's place of the copy rates, a code showing the figure at one's place of the copy rates, and a cancel code for canceling the inputted copy mode. The bar code is composed of two digit or three digit code.

At a reception desk of the copy center, a client's copy request is made by handling the bar code reader as described below (1) Reading of the receipt No.
(2) Reading of the department code
(3) Reading of the copy mode
(4) Transferring data to the management machine and confirming the mode, department name, etc. at the display section
(5) Transferring data to the copying machine by pressing the transferring switch of the management machine The copy rates setting is conducted as described below.

(1) Reading of each copy rates setting bar code corresponding
to each sheet size
(2) Reading of each digit of each bar code
The operation has thus been completed.

Cancelling is conducted as described below.
(1) Reading of the receipt No. bar code
(2) Reading of the cancel bar code FIG. 65 is a control block diagram of the management machine 662.

There are shown a $\mu$CPU 640, a RAM for storing the copying modes, receipt No., department codes and copy charges on every department, etc., a back up battery 655 with a diode 654 for the RAM, a ROM 642 for storing the controlling software and fixed data for the management machine 662, a display section 644 and an interface section 643 for displaying data transmitted from the bar code reader, etc. There are also shown a receiving section 656 for photo-electric conversion of photo signals emitted serially from the bar code reader 660, a cable 659 for communicating with the main body of the copying machine, a serial interface 645 for converting the serial data from the receiving section 656 and from the cable 659 into parallel data, and a parallel interface 646 having various kinds of parallel ports. The parallel interface 646 is connected with a transferring switch 647 for transferring the data inputted from the bar code reader 660 to the main body of the copying machine, a pull-up resistor 648 therefor, a buzzer 649 for generating a confirmation sound when the signals transmitted from the bar code reader 660 is correctly received or when a switch such as the transferring switch 647 is turned ON, a driver 650 for the buzzer 649, a switch 652 for displaying copy charges on every department monthly or daily, a pull-up resistor 653 for the switch 652, a switch 657 for outputting the content of the display 644 to printer 651 and a pull-up resistor 658 for the switch 657.

The explanations have been made of the inputting method in the copy center mode with the bar code reader. The bar code reader may not always comprise the decoding section, memory section and transferring section as in the embodiment described above but the output signals of the reading section may be transmitted etc. to the management machine by way of a cable.

As described above, in the copying machine according to the present invention, it is possible to set various copying modes easily and rapidly by utilizing bar codes. The present invention is no way restricted only to the embodiments described above but those skilled in the art can practice various applications and modifications without departing from the gist of the present invention.

What is claimed is:

1. A copying machine comprising a sheet in which bar codes corresponding to addressed of a required portion of an original, a bar code reader for reading bar codes from said sheet and a control section for setting addresses in an editing mode based on signals transmitted from said bar code reader.

2. A copying machine comprising a first sheet in which bar codes corresponding to various copying modes are printed, a bar code reader for reading the bar codes from said first, and a control section for programming a mode comprising a plurality of the copying modes based on signals transmitted from the bar code reader while appending an index at a second sheet in which bar codes corresponding to indexes are printed, said copying machine being capable of setting the programmed mode by reading a bar code corresponding to the index from the second sheet with the bar code reader.

3. A color copying machine comprising a sheet in which a plurality of colors and bar codes corresponding to the colors are printed, a bar code reader for reading the bar codes from said sheet and a control section for controlling copying colors depending on signals transmitted from said bar code reader.

4. A copying machine comprising:
   a sheet fixedly attached to a surface of a main body of the copying machine, in which bar codes corresponding to various copying modes are printed;
   a portable type bar code reader being separable from the main body for reading the bar codes from the sheet;
   a decoding section disposed in the main body for decoding signals transmitted from said bar code reader; and
   a control section disposed in the main body for setting a copying mode based on data derived from said decoding section.

5. A copying machine comprising:
   an instruction manual in which explanations for various copying modes, bar codes corresponding to the copying modes and input procedures are printed;
   a portable type bar code reading section being separable from a main body of the copying machine and being capable of reading the bar codes from the instruction manual at a distance from the main body and storing said bar codes read from the instruction manual therein; and
   a control section disposed in the main body for setting a copying mode based on the bar codes stored in the bar code reading section.

6. A copying machine using a first sheet in which bar codes corresponding to various copying modes are printed and a second sheet in which bar codes corresponding to indexes are printed, said copying machine comprising:
   a portable type bar code reader being separable from a main body of the copying machine for reading the bar codes from the first sheet; and
   a control section disposed in the main body for programming a mode comprising a plurality of the copying modes based on signals transmitted from the bar code reader while appending an index at the second sheet, said copying machine being capable of setting the programmed mode by reading a bar code corresponding to the index from the second sheet with the bar code reader.

* * * * *